C. J. LANTZ.
NUT LOCK.
APPLICATION FILED JAN. 28, 1913.
1,081,239.
Patented Dec. 9, 1913.
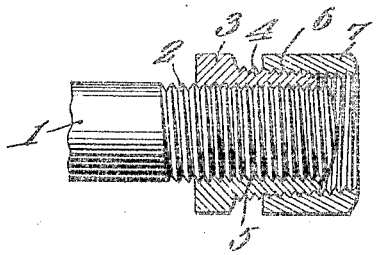
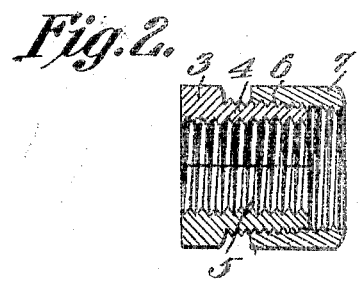
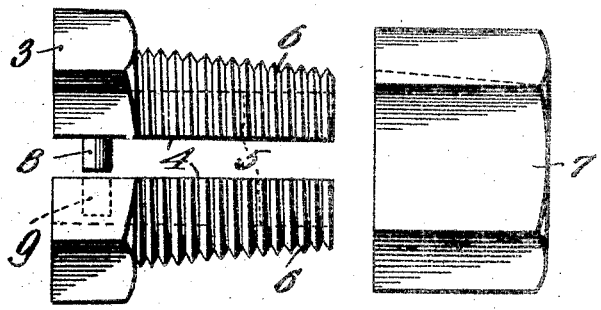
Witnesses
C. J. Lantz,
Inventor
by C. A. Snow & Co.
Attorneys

UNITED STATES PATENT OFFICE.

CHARLES J. LANTZ, OF GOWRIE, IOWA.

NUT-LOCK.

1,081,239.

Specification of Letters Patent.

Patented Dec. 9, 1913.

Application filed January 28, 1913. Serial No. 744,696.

*To all whom it may concern:*

Be it known that I, CHARLES J. LANTZ, a citizen of the United States, residing at Gowrie, in the county of Webster and State of Iowa, have invented a new and useful Nut-Lock, of which the following is a specification.

This invention relates to a nut lock and more particularly to that class of nut locks in which the nut is compressed against the bolt to prevent the turning of the said nut.

An object of the present invention is to provide a nut lock which may be easily and readily assembled in position upon a bolt and readily and securely locked thereto.

A further object is to provide a nut composed of two parts and suitable means upon their contacting surface for the insurance of the alinement thereof upon a bolt previous to the insertion thereon of the locking nut.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings acompanying this specification and forming a part thereof, the preferable form of my invention is illustrated, in which:—

Figure 1 is a cross sectional view illustrating my improved nut lock fastened securely to a bolt. Fig. 2 is a similar view thereof in which the bolt has been removed. Fig. 3 is a view showing the two parts of the nut separated a distance apart previous to the insertion thereon of the locking nut.

Referring to the drawings in which similar reference numerals designate corresponding parts throughout the several views. 1 represents the bolt provided with the threaded end 2 upon which threaded end is illustrated my improved nut lock.

The numeral 3 represents the nut portion with 4 an extension formed integral therewith and projecting therefrom. The nut and extension 3 and 4 are internally threaded as at 5 to thereby threadedly engage the portion 2 of the bolt. The extension 4 is provided with the exterior threads 6 which are preferably cut upon a conical surface as illustrated. The nut and extension 3 and 4 are parted longitudinally as more clearly illustrated in Fig. 3 and when positioned upon a bolt are devised to be spaced a slight distance apart in order that the locking nut 7 which threadedly engages the exterior threads 6 is adapted to force the two parts of the nut and extension together and to thereby securely lock them upon the bolt 2.

The locking nut 7 is provided with the interior threads preferably cut at a slight angle in order to suitably engage the threads 6 of the extension 4. In order that the two parts of the nut and extension may be readily assembled upon a bolt and furthermore in order that the threads formed thereon may be more easily placed in proper alinement, the projecting lugs 8 are formed upon the portion 3, and the adjacent portion thereto is formed with the depressions or pockets 9 in which the said lugs 8 are adapted to extend. In the present instance there are two of the projecting lugs 8 and two of the corresponding depressions 9 therefor but it is to be understood that the extension 4 may be provided along its cut surface with the projecting lugs and the corresponding apertures or depresions therefor. By reason of the projecting lugs 8, the longitudinal portions of the nut 3 and extension 4 may be readily assembled upon a bolt and by the lugs fitting in their corresponding depressions, the proper alinement of the threaded nut upon the two portions will be secured.

Having thus fully described the construction of my improved nut lock what I claim to be new and original with me is:—

In a device of the character described, a two part longitudinally divided nut, a two part longitudinally divided externally threaded extension carried thereby, said extension and nut provided with a threaded aperture extending therethrough, a plurality of cylindrical projections carried by the contacting faces of one of said nut parts, the opposite portion of said nut provided with a plurality of cylindrical bores adapted to receive said cylindrical projections therein, said cylindrical projections interlocking with the said cylindrical bores and holding the two parts of the nut and extension against relative transverse and longitudinal movements, and a locking nut provided with internal threads extending therethrough adapted to threadedly engage said extension and to force the parts of the said nut and extension together, the two part nut and extension adapted to engage the threaded portion of a bolt and to be securely and frictionally locked thereto by the said locking nut which forces the two part nut and extension into forced contact therewith.

In testimony that I claim the foregoing as my own, I have hereto affixed my signature in the presence of two witnesses.

CHARLES J. LANTZ.

Witnesses:
 JONAS LINDQUIST,
 WILSON T. SCOTT.